(12) United States Patent
Suzuki

(10) Patent No.: US 8,934,037 B2
(45) Date of Patent: Jan. 13, 2015

(54) IMAGING DEVICE EMPLOYING ROLLING SHUTTER SYSTEM

(71) Applicant: Casio Computer Co., Ltd., Shibuya-ku, Tokyo (JP)

(72) Inventor: Hiroshi Suzuki, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 40 days.

(21) Appl. No.: 13/783,030

(22) Filed: Mar. 1, 2013

(65) Prior Publication Data
US 2013/0229553 A1    Sep. 5, 2013

(30) Foreign Application Priority Data

Mar. 2, 2012  (JP) ................................. 2012-046303

(51) Int. Cl.
*H04N 5/335* (2011.01)
*H04N 5/353* (2011.01)

(52) U.S. Cl.
CPC ............. *H04N 5/335* (2013.01); *H04N 5/3532* (2013.01)
USPC ........................................ 348/296; 348/302

(58) Field of Classification Search
None
See application file for complete search history.

(56) References Cited

U.S. PATENT DOCUMENTS

| 8,031,246 B2 | 10/2011 | Makino et al. |
| 2009/0262186 A1 | 10/2009 | Tabata et al. |
| 2011/0205415 A1 | 8/2011 | Makino et al. |

FOREIGN PATENT DOCUMENTS

| JP | 2008-288904 A | 11/2008 |
| JP | 2009-254736 A | 11/2009 |
| JP | 2010-074314 A | 4/2010 |

OTHER PUBLICATIONS

Korean Office Action dated Feb. 20, 2014 (and English translation thereof) in counterpart Korean Application No. 10-2013-0019849.

*Primary Examiner* — Twyler Haskins
*Assistant Examiner* — Angel L Garces-Rivera
(74) *Attorney, Agent, or Firm* — Holtz, Holtz, Goodman & Chick PC

(57) ABSTRACT

An imaging device includes an imaging unit having a pixel group two-dimensionally arranged vertically and horizontally, and configured to read pixel signals associated with generation of a frame image in units of lines by a rolling shutter system, and a drive unit configured to periodically switch, when a plurality of frame images are consecutively read from the imaging unit with a predetermined frame period in video recording, positions of a plurality of lines each of which is made a read object in each of the frame images in units of frames.

9 Claims, 6 Drawing Sheets

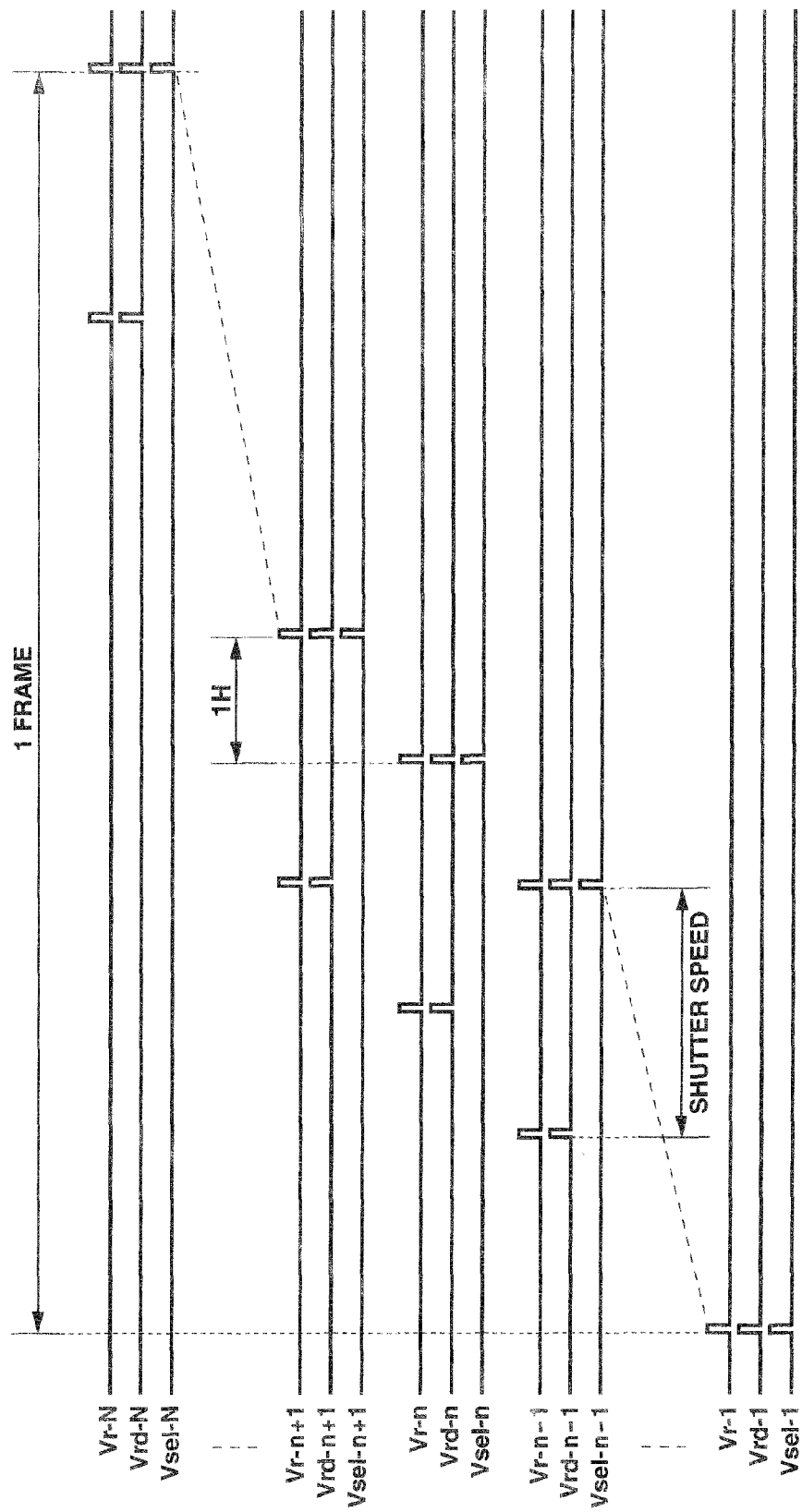

IMAGING DEVICE EMPLOYING ROLLING SHUTTER SYSTEM

CROSS-REFERENCE TO RELATED APPLICATIONS

This application is based upon and claims the benefit of priority from prior Japanese Patent Application No. 2012-046303, filed Mar. 2, 2012, the entire contents of which are incorporated herein by reference.

BACKGROUND OF THE INVENTION

1. Field of the Invention

The present invention relates to an imaging device and imaging method employing a rolling shutter system.

2. Description of the Related Art

In recent years, digital cameras and video cameras using a complementary metal oxide semiconductor (CMOS) imaging device (hereinafter referred to as a CMOS image sensor) have become generally widespread. A CMOS image sensor is structured to output a signal of each pixel by X (vertical) scanning and Y (horizontal) scanning of a group of pixels arranged two-dimensionally, vertically and horizontally.

As a drive method of the CMOS image sensor, a rolling shutter system described in, for example, Jpn Pat. Appln. KOKAI Publication No. 2008-288904 is generally employed. The rolling shutter system is configured to scan a group of pixels arranged two-dimensionally, vertically and horizontally, within one frame period for each line, and sequentially read signals of the pixels.

FIG. 6 is a timing chart showing operation timing of a CMOS image sensor according to the conventional rolling shutter system. In FIG. 6, 1, . . . , n−1, n, n+1, . . . , N are line numbers. Normally, the CMOS image sensor is driven by drive signals consisting of a reset pulse (Vr), redirection pulse (Vrd), and selection pulse (Vsel). That is, in pixels of each line, exposure is started at the input, timing of the reset pulse (Vr), and redirection pulse (Vrd), after that, exposure is terminated at the input timing of the reset pulse (Vr), redirection pulse (Vrd), and selection pulse (Vsel), and then pixel signals of one line are read within a fixed read period 1H set immediately after that.

More specifically, this read period 1H consists of (read period of pixel signals for one line+horizontal blanking period). Further, a period corresponding to (read period× number of lines) is the minimum one frame period of a case of video recording. Accordingly, in video recording, imaging at a higher frame rate is enabled by carrying out thinning-out-reading of thinning out, at regular intervals, lines from which pixel signals are to be read.

However, when video recording is carried out by driving the CMOS image sensor based on the rolling shutter system, the maximum settable exposure time (shutter speed) becomes a time approximately equal to one frame period. Accordingly, the higher the frame rate, the narrower the follow-up range of exposure becomes.

BRIEF SUMMARY OF THE INVENTION

According to one aspect of the present invention, there is provided an imaging device comprising: an imaging unit having a pixel group two-dimensionally arranged vertically and horizontally, and configured to read pixel signals associated with generation of a frame image in units of lines by a rolling shutter system; and a drive unit configured to periodically switch, when a plurality of frame images are consecutively read from the imaging unit with predetermined frame period in video recording, positions of a plurality of lines each of which is made a read object in each of the frame images in units of frames.

According to another aspect of the present invention, there is provided an imaging method for use in an imaging device including an imaging unit having a pixel group two-dimensionally arranged vertically and horizontally, the method comprising: reading pixel signals associated with generation of a frame image in units of lines by a rolling shutter system; and periodically switching, when a plurality of frame images are consecutively read from the imaging unit with a predetermined frame period in video recording, positions of a plurality of lines each of which is made a read object in each of the frame images in units frames.

According to still another aspect of the present invention, there is provided a non-transitory computer-readable storage medium having a program stored thereon which control a computer of an imaging device including an imaging unit having a pixel group two-dimensionally arranged vertically and horizontally, to perform functions comprising: reading pixel signals associated with generation of a frame image in units of lines by a rolling shutter system; and periodically switching, when a plurality of frame images are consecutively read from the imaging unit with a predetermined frame period in video recording, positions of a plurality of lines each of which is made a read object in each of the frame images in units of frames.

Additional objects and advantages of the invention will be set forth in the description which follows, and in part will be obvious from the description, or may be learned by practice of the invention. The objects and advantages of the invention may be realized and obtained by means of the instrumentalities combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 6 is a timing chart of a case where video recording is carried out by a conventional imaging method.

DETAILED DESCRIPTION OF THE INVENTION

Hereinafter, an embodiment of the present invention will be described with reference to the drawings.

Figure 1:
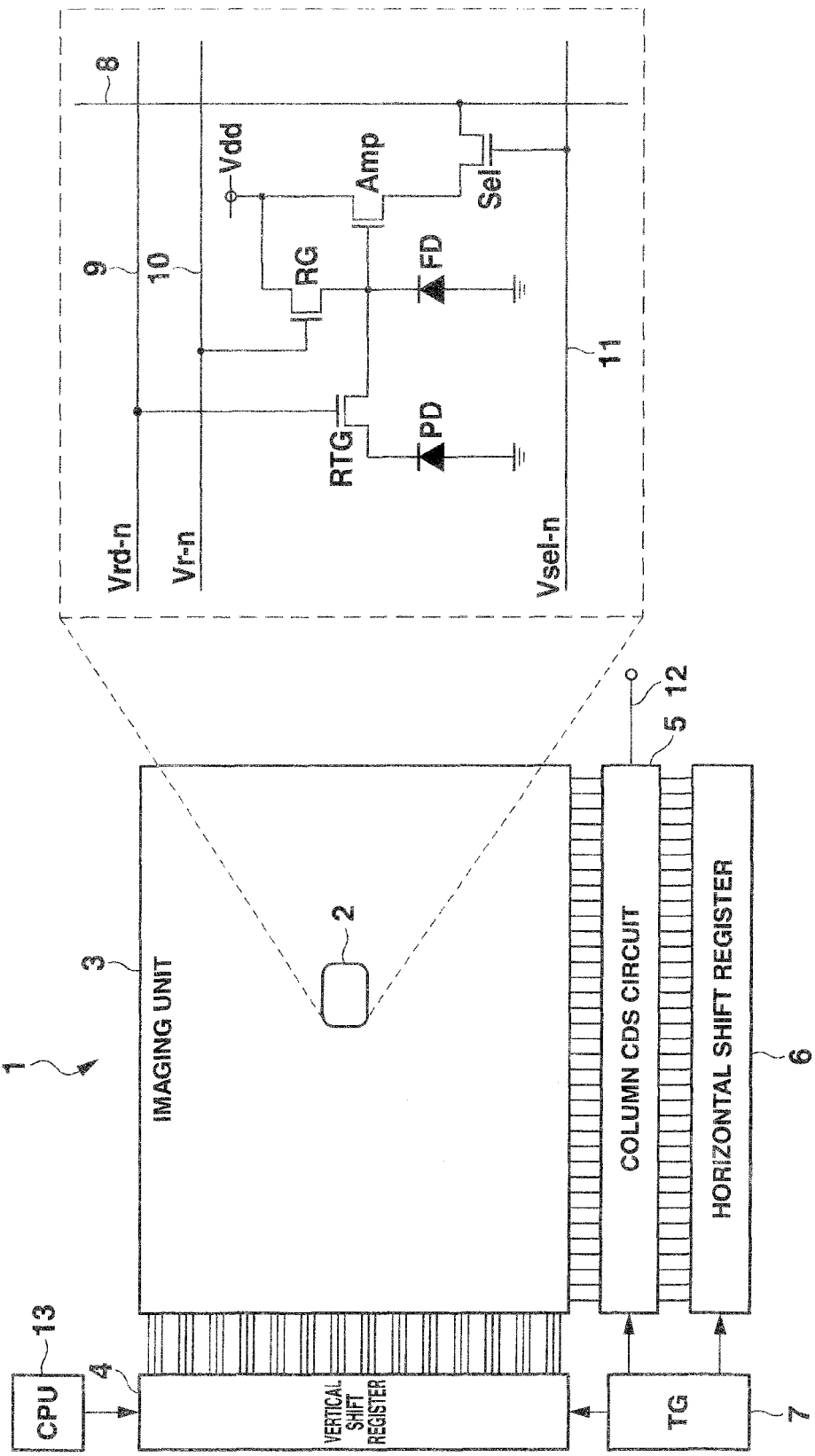
FIG. 1 is a view showing configuration examples of a CMOS image sensor, and an imaging unit to which the present invention is applied.

FIG. 1 is a schematic configuration view showing a CMOS image sensor 1 according to the present invention.

The CMOS image sensor 1 has a configuration including an imaging unit 3 in which a large number of pixels 2 are two-dimensionally arranged vertically and horizontally, vertical shift register 4 serving as a drive unit, column correlated double sampling (CDS) circuit 5, horizontal shift register 6, timing generator (TG) 7, and the like. In the imaging unit 3, in each pixel, a vertical signal line 8 is wired for each column, and a redirection signal line 9, reset signal line 10, and selection signal line 11 are wired for each row.

Further, as shown in FIG. 1, each pixel 2 consists of a photodiode PD, redirection transistor RGT, amplifying transistor Amp, pixel selection transistor Sel, reset transistor RG, and floating diffusion ED.

The photodiode PD is a photoelectric conversion unit configured to generate and accumulate signal charge corresponding to incident light. The redirection transistor RGT is on during a period during which a redirection pulse (Vrd-n) applied to a gate thereof from the redirection signal line 9 is at the high level, and redirects the signal charge accumulated in the photodiode PD to the floating diffusion ED.

The amplifying transistor Amp generates, in accordance with a situation where a voltage corresponding to the signal charge redirected to the floating diffusion PD is input to a gate thereof, a signal corresponding to the signal charge redirected to the floating diffusion PD.

The pixel selection transistor Sel is on during period during which a selection pulse (Vsel-n) applied to a gate thereof from the selection signal line 11 is at the high level, and makes the part between the vertical signal line 8 connected to a source thereof and a source of the amplifying transistor Amp conductive. Thereby, a signal of the specific pixel 2 is output to the vertical signal line 8.

The reset transistor PG is on during a period during which a reset pulse (Vr-n) applied to a gate thereof from the reset signal line 10 is at the high level, and resets the charge of the floating diffusion FD.

On the other hand, the vertical shift register 4 appropriately generates drive signals consisting of the aforementioned redirection pulse (Vrd-n), selection pulse (Vsel-n), and reset pulse (Vr-n), carries out sweeping away of the signal charge in the photodiode PD, and shutter scanning for starting of accumulation of new signal charge for the pixel 2 of each line, and carries out read-scanning for carrying out signal reading for the pixel 2 of each line. A period from the timing at which the unnecessary charge in the photodiode PD is reset by the shutter scanning to the timing at which signal reading is started by the read-scanning is the exposure period. Details of the vertical shift register 4 will be described later.

The column CDS circuit 5 is arranged in each column of the imaging unit 3, carries out removal of reset noise and fixed pattern noise peculiar to each pixel 2 by CDS processing with respect to a signal output from each pixel 2 of a read row selected by the vertical shift register 4 to the vertical signal line 8, and temporarily holds the pixel signal which has been subjected to the processing.

The horizontal shift register 6 carries out horizontal scanning by using a horizontal selection switch (not shown) connected to an output end of the column CDS circuit 5, and sequentially outputs pixel signals of one line temporarily held in the column CDS circuit 5 to the horizontal signal line 12.

The TG 7 generates timing signals including a vertical synchronization signal, and a horizontal synchronization signal serving as criteria of operations of the vertical shift register 4, column CDS circuit 5, and horizontal shift register 6, and supplies these timing signals to the vertical shift register 4, and horizontal shift register 6.

Further, the operations of the vertical shift register 4, and TG 7 are controlled by a CPU 13. The CPU 13 is configured to control a digital camera, video camera or the like including a CMOS sensor 1 and provided with a video recording function.

Figure 2:
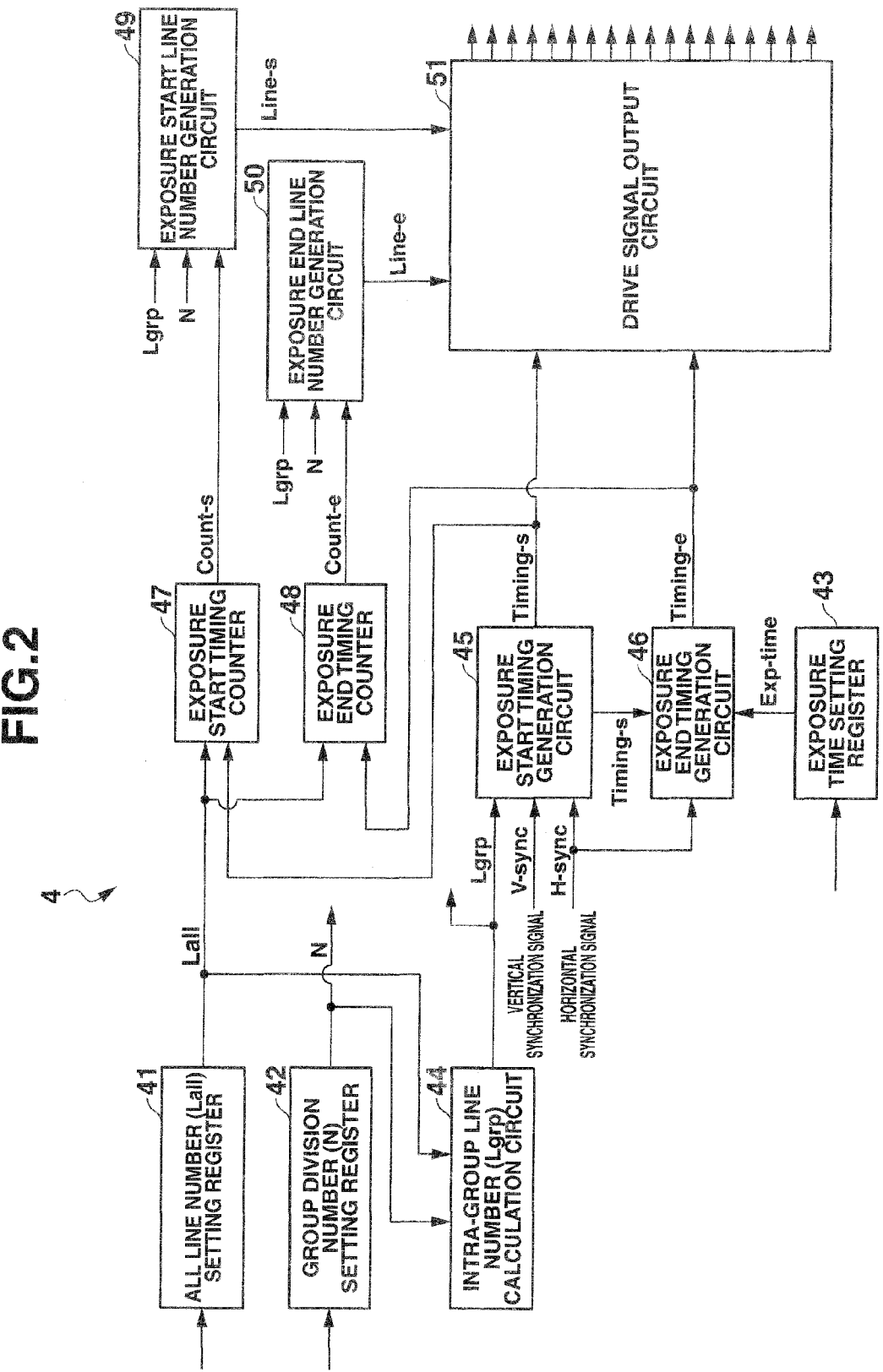
FIG. 2 is a circuit configuration diagram of a vertical shift register.

Next, details of the vertical shift register 4 in this embodiment will be described below. FIG. 2 is a block diagram showing the circuit configuration of the vertical shift register 4.

As shown in FIG. 2, the vertical shift register 4 is provided with three types of registers including an all line number setting register 41, group division number setting register 42, exposure time setting register 43. The three types of registers 41, 42, and 43 are configured to hold arbitrary parameters and the like appropriately set by the CPU 13 at the time of drive of the CMOS image sensor 1.

That is, the all line number setting register 41 holds the number of lines of pixels to be used for generation of a frame image as the number of all the lines (Lall). The group division number setting register 42 holds a group division number (N) used when the pixel group of the imaging unit 3 is divided into a plurality of groups consisting of a plurality of lines. The exposure time setting register 43 holds an exposure time (Exp-time) of each pixel 2 to be used for generation of a frame image in the imaging unit 3. It should be noted that in the exposure time setting register 43, an exposure time set by the CPU 13 is held as a value obtained by converting the exposure time into the number of pulses of the horizontal synchronization signal (H-sync) to be supplied from the TG 7 to the vertical shift register 4.

Further, the vertical shift register 4 is provided with an intra-group line number calculation circuit 44, exposure start timing generation circuit 45, exposure end timing generation circuit 46, exposure start timing counter 47, exposure end timing counter 48, exposure start line number generation circuit 49, exposure end line number generation circuit 50, and drive signal output circuit 51.

The intra-group line number calculation circuit 44 calculates the number of lines (Lgrp) in each group from the group division number (N) and all line number (Lall) by using the following formula (1), and holds the number.

$$L\text{grp}=L\text{all}/N \quad (1)$$

The exposure start timing generation circuit 45 outputs exposure start timing signals (Timing-s) of a number corresponding to the intra-group line number (Lgrp) while sequentially synchronizing the signals (Timing-s) with the horizontal synchronization signal (H-sync) each time a vertical synchronization signal (V-sync) is input from the TG 7.

The exposure start timing counter 47 outputs, each time an exposure start timing signal (Timing-s) is input, the exposure start timing signal (Timing-s) while incrementing the count value (Count-s), and initializes the count value (Count-s) to zero each time the count value reaches the all line number (Lall).

The exposure start line number generation circuit 49 calculates an exposure start line number (Line-s) from the count value (Count-s) of the exposure start timing counter 47, intra-group line number (Lgrp), and group division number (N) by using the following formula (2), and outputs the calculated exposure start line number (Line-s) to the drive signal output circuit 51.

$$\text{Line-}s=\text{int}\{\text{Count-}s/L\text{grp}\}+\{\text{Count-}s \bmod L\text{grp}\}\times N \quad (2)$$

(where int is a function used to obtain a quotient (integer part), and mod is a function to obtain a remainder of division)

The exposure end timing generation circuit 46 sequentially outputs exposure end timing signals (Timing-e) obtained by delaying sequentially input exposure start timing signals (Timing-s) by the exposure time (Exp-time).

The exposure end timing counter 48 outputs, each time an exposure end timing signal (Timing-e) is input, the exposure end timing signal (Timing-e) while incrementing the count value (Count-e), and initializes the count value (Count-e) to zero each time the count value reaches the all line number (Lall).

The exposure end line number generation circuit 50 calculates an exposure end line number (Line-e) from the count value (Count-e) of the exposure end timing counter 48, intra-group line number (Lgrp), and group division number (N) by using the following formula (3), and outputs the calculated exposure end line number (Line-e) to the drive signal output circuit 51.

$$\text{Line-}e=\text{int}\{\text{Count-}e/L\text{grp}\}+\{\text{Count-}e \bmod L\text{grp}\}\times N \qquad (3)$$

(where int is a function used to obtain a quotient (integer part), and mod is a function used to obtain a remainder of division)

The drive signal output circuit 51 outputs drive signals corresponding to a line selected by the exposure start line number (Line-s), i.e., a reset pulse (Vr-n), and redirection pulse (Vrd-n) in sequence in an exposure start indication state each time an exposure start timing signal (Timing-s) is input. Further, the drive signal output circuit 51 outputs drive signals corresponding to a line selected by the exposure end line number (Line-e), e.g., a reset pulse (Vr-n), redirection pulse (Vrd-n), and selection pulse (Vsel-n) in sequence in an exposure end indication state each time an exposure end timing signal (Timing-e) is input.

Further, in the CMOS image sensor 1, the vertical shift register 4 drives the imaging unit 3 by the rolling shutter system by an operation to be described later at the time of video recording, and sequentially reads signals of pixels associated with generation of a frame image constituting the dynamic picture image in units of lines from the pixels 2. At that time, unlike in the usual manner, the vertical shift register 4 periodically changes a plurality of lines which are made the read object of the pixel signals associated with generation of the frame image in units of frames, thereby causing pixels of each line to output pixel signals with a period longer than the frame period.

Figure 3:
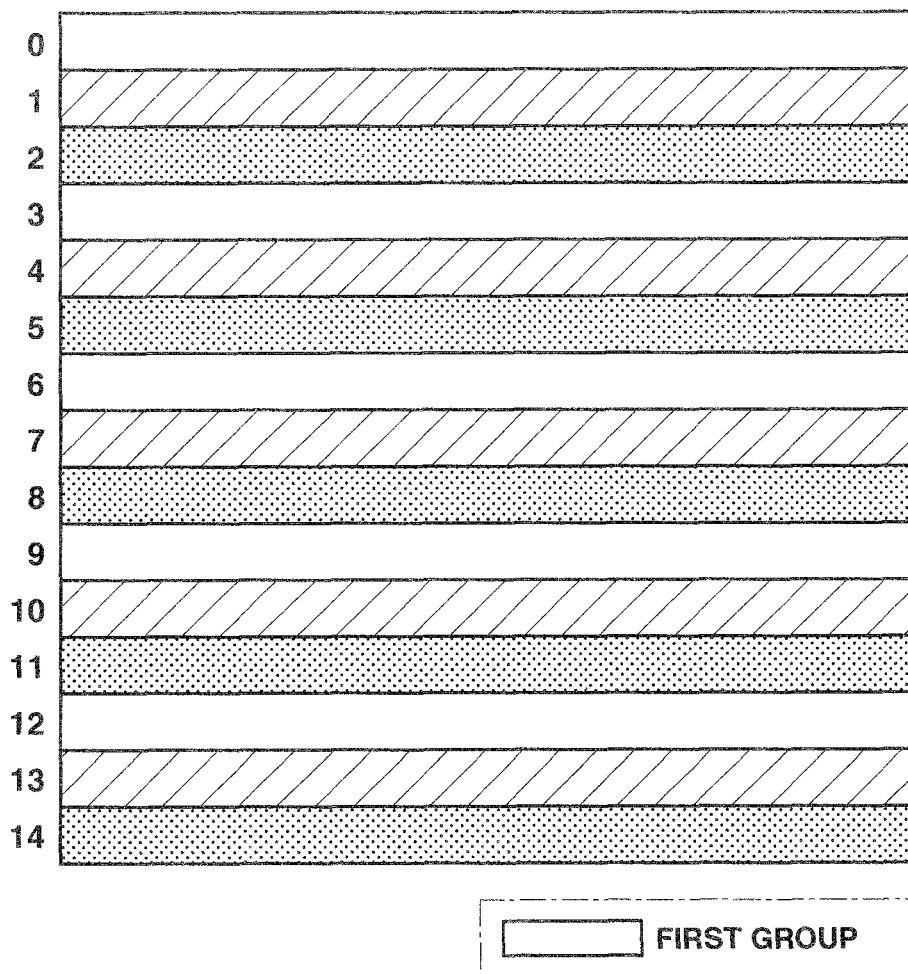
FIG. 3 is a schematic diagram showing groups formed by dividing a group of pixels in an imaging unit into groups by a plurality of lines.

That is, in this embodiment, the vertical shift register 4 divides a pixel group associated with generation of the frame image into a plurality of groups consisting of a plurality of lines arranged at predetermined line intervals, switches the group of the read object of the pixel signals for each frame, and sequentially causes the pixel groups to output pixel signals associated with generation of one frame image with a period corresponding to the number of groups Hereinafter, the operation of the vertical shift register 4 will be specifically described with reference to the drawings. Here, it is assumed for the sake of convenience that the total number of lines of the pixel group in the imaging unit 3 is 15 as shown FIG. 3. Further, it is assumed that 15 is set by the CPU 13 in the all line number setting register 41 as the all line number (Lall) which is the number of lines of pixels used to generate the frame image, and 3 is set in the group division number setting register 42 as the group division number (N).

Figure 4:
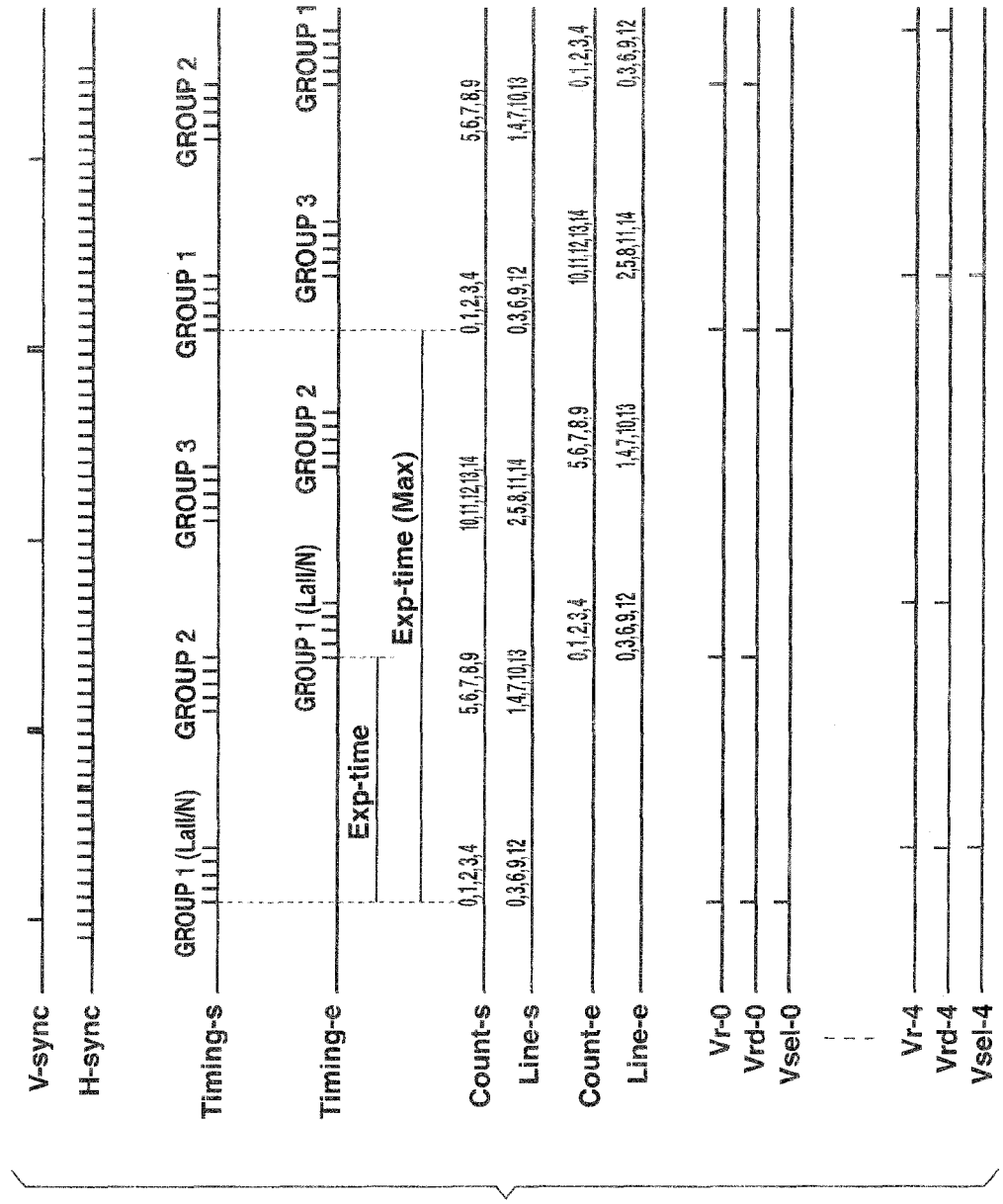
FIG. 4 is a timing chart of a case where video recording is carried out by an imaging method of the present invention.

That is, the case where the vertical shift register 4 divides all the pixels in the imaging unit 3 into a first group, second group, and third group each of which consists of five lines each arranged at three line intervals to thereby drive all the pixels, will be described below. FIG. 4 is a timing chart showing the drive timing of that case.

At the time of such drive, the number of lines in each group to be calculated in the intra-group line number calculation circuit 44 is 5, and the exposure start timing generation circuit 45 sequentially outputs exposure start timing signals (Timing-s) for five lines in synchronism with the horizontal synchronization signal (H-sync) each time a vertical synchronization signal (V-sync) is input. During the time, the count value (Count-s) of the exposure start timing counter 47 repetitively changes from 0 to 14 each time an exposure start timing signal (Timing-s) is input.

Further, while the count value (Count-s) of the exposure start timing counter 47 changes from 0 to 4 immediately after the input of the vertical synchronization signal (V-sync) at the beginning of the drive, 0, 3, 6, 9, and 12 are sequentially generated in the exposure start line number generation circuit 49 as the exposure start line numbers (Line-s). Concomitantly with this, a reset pulse (Vr-n), and redirection pulse (Vrd-n) are output in sequence from the drive signal output circuit 51 to the pixel groups of lines belonging to the first group shown in FIG. 3 including the line of line number 0. That is, the lines belonging to the first group are shutter-scanned, and the pixel groups of the lines are started to be exposed in sequence.

Further, while the count value (Count-s) of the exposure start timing counter 47 changes from 5 to 9 immediately after the input of the next vertical synchronization signal (V-sync), 1, 4, 7, 10, and 13 are sequentially generated in the exposure start line number generation circuit 49 as the exposure start line numbers (Line-s). Concomitantly with this, a reset pulse (Vr-n), and redirection pulse (Vrd-n) are output in sequence from the drive signal output circuit 51 to the pixel groups of lines belonging to the second group shown in FIG. 3 including the line of line number 1. That is, the lines belonging to the second group are shutter-scanned, and the pixel groups of the lines are started to be exposed in sequence.

Furthermore, while the count value (Count-s) of the exposure start timing counter 47 changes from 10 to 14 immediately after the input of the next vertical synchronization signal (V-sync), 2, 5, 8, 11, and 14 are sequentially generated in the exposure start line number generation circuit 49 as the exposure start line numbers (Line-s). Concomitantly with this, a reset pulse (Vs-n), and redirection pulse (Vrd-n) are output in sequence from the drive signal output circuit 51 to the pixel groups of lines belonging to the third group shown in FIG. 3 including the line of line number 2. That is, the lines belonging to the third group are shutter-scanned, and the pixel groups of the lines are started to be exposed in sequence.

Further, in the vertical shift register 4, in parallel with the above operation, the exposure end timing generation circuit 46 sequentially outputs exposure end timing signals (Timing-e) at timing delayed from the input timing of each of the sequentially input exposure start timing signals (Timing-s) by the exposure time (Exp-time) set in the exposure time setting register 43, i.e., at timing delayed from the above input timing by an amount of time corresponding to the number of pulses of the horizontal synchronization signal (H-sync) corresponding to the exposure time (Exp-time).

During that time, each time the exposure end timing signal (Timing-e) is input, the count value (Count-e) of the exposure end timing counter 48 repetitively changes from 0 to 14.

Further, while the count value (Count-e) of the exposure end timing counter 48 changes from 0 to 4 at timing delayed from the input timing of the vertical synchronization signal (V-sync) by the exposure time (Exp-time), 0, 3, 6, 9, and 12 are sequentially generated in the exposure end line number generation circuit 50 as the exposure end line numbers (Line-e).

Concomitantly with this, a reset pulse (Vr-n), redirection pulse (Vrd-n), and selection pulse (Vsel-n) are output in sequence for each line from the drive signal output circuit 51 to the pixel groups of lines belonging to the first group. That is, read scanning is carried out for each line belonging to the first group, and the pixel signals of each line are sequentially read as pixel signals associated with generation of the first frame image.

Further, while the count value (Count-e) of the exposure end timing counter 48 changes from 5 to 9 at timing delayed from the input timing of the next vertical synchronization signal (V-sync) by the exposure time (Exp-time), 1, 4, 7, 10, and 13 are sequentially generated in the exposure end line number generation circuit 50 as the exposure end line numbers (Line-e).

Concomitantly with this, a reset pulse (Vr-n), redirection pulse (Vrd-n), and selection pulse (Vsel-n) are output in sequence for each line from the drive signal output circuit 51 to the pixel groups of lines belonging to the second group. That is, read scanning is carried out for each line belonging to the second group and the pixel signals of each line are sequentially read as pixel signals associated with generation of the second frame image.

Furthermore, while the count value (Count-e) of the exposure end timing counter 48 changes from 10 to 14 at timing delayed from the input timing of the next vertical synchronization signal (V-sync) by the exposure time (Exp-time), 2, 5, 8, 11, and 14 are sequentially generated in the exposure end line number generation circuit 50 as the exposure end line numbers (Line-e).

Concomitantly with this, a reset pulse (Vr-n), redirection pulse (Vrd-n), and selection pulse (Vsel-n) are output in sequence for each line from the drive signal output circuit 51 to the pixel groups of lines belonging to the third group. That is, read scanning is carried out for each line belonging to the third group, and the pixel signals of each line are sequentially read as pixel signals associated with generation of the third frame image.

After this, an operation identical to the above operation is repeated, whereby signals of pixel groups of a plurality of lines belonging to each group are sequentially read in sequence with three frame periods longer than the frame period each time (for each frame) a vertical synchronization signal (V-sync) is input. That is, pixel signals of a number of lines thinned out to one third of the original number are read in sequence as pixel signals associated with generation of each frame image, and thinned-out lines are switched in sequence for each frame.

Thereby, video recording can be carried out at a high frame rate by carrying out the thinned-out reading. Even in the case of the maximum frame rate that can be set at a time, i.e., in the case where one frame period is the shortest, a time identical to that of the case where the thinned-out reading of the pixel signals is not carried out is secured as the maximum settable exposure time (Exp-time (Max)).

Accordingly, even in the case where such a dark object that the follow-up range of exposure is wide even at the time of video recording to be carried out at a high frame rate, and that an appropriate exposure time cannot be secured by the conventional method is to be imaged, it is possible to secure an appropriate exposure time, and obtain a dynamic picture image having optimum brightness as an imaging result.

Incidentally, although the longer the period with which pixel signals are read from pixels of a plurality of lines of the same group, the wider the follow-up range of exposure at the time of video recording becomes, the more the group division number, the lower the image quality becomes. Accordingly, it is desirable that the group division number be made as small as possible within a range corresponding to an exposure time to be secured to obtain an appropriate frame rate and/or appropriate exposure, or corresponding to resolution required for the dynamic picture image. Regarding this point, in this embodiment, the configuration in which the group division number can appropriately be set in the group division number setting register 42 is employed, and the group division number can be controlled, and hence it is possible to cope with the above requirement.

Figure 5:
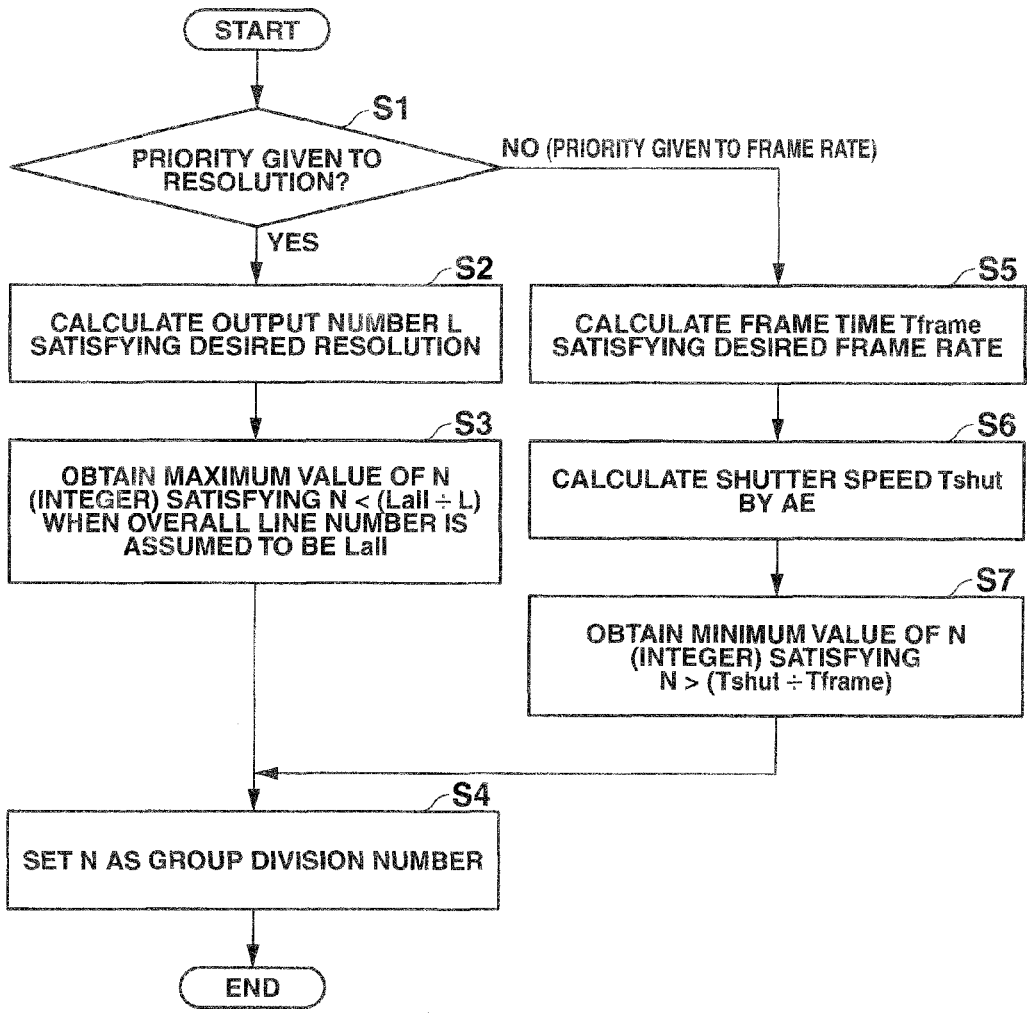
FIG. 5 is a flowchart showing an example of a determination procedure of a group division number.

Although the method of determining the group division number to be set in the group division number setting register 42 may arbitrarily be devised, for example, by causing the CPU 13 to determine the group division number by the processing shown in FIG. 5, it is possible to make the group division number appropriate.

FIG. 5 is a flowchart showing the processing of a case where the CPU 13 determines a group division number by giving priority to one of the resolution and frame rate in accordance with, for example, a user request at the time of video recording in a digital camera, video camera or the like including a CMOS image sensor 1, and provided. with a video recording function.

Hereinafter, the processing contents will be described. When priority is given to the resolution (step S1: YES), the CPU 13 calculates the output line number L satisfying the resolution desired by the user (step S2). Next, the CPU 13 obtains the maximum value of N (integer) satisfying the following formula (4) when the overall line number of pixels of the CMOS image sensor 1 is assumed to be Lall (step S3).

$$N < (Lall \div L) \qquad (4)$$

Further, the CPU 13 determines the obtained number N as the group division number, and sets the number N in the group division number setting register 42 (step 34). Thereby, it is possible to determine a more appropriate group division number corresponding to the required resolution.

On the other hand, when priority is given to the frame rate (step S1: NO), the CPU 13 calculates a frame time Tframe satisfying the frame rate desired by the user (step S5). Next, the CPU 13 calculates an appropriate shutter speed Tshut corresponding to the brightness of the object by automatic exposure (AE) processing (step S6) and, thereafter obtains the minimum value of the number N (integer) satisfying the following formula (5) (step 37).

$$N > (Tshut \div Tframe) \qquad (5)$$

Further, the CPU 13 determines the obtained number N as the group division number, and sets the number N in the group division number setting register 42 (step S4). Thereby, it is possible to determine a more appropriate group division number corresponding to the required frame rate. Consequently, it is possible to obtain, as the result of the imaging, a dynamic picture image having the optimum brightness while holding the deterioration of the image quality to the minimum.

It should be noted that here when priority is given to the frame rate, the case where a group division number which takes the shutter speed into consideration, i.e., a group division number that makes it possible to obtain a dynamic picture image having the optimum brightness is determined has been described. However, the group number may be one which simply satisfies only the desired frame rate without taking the shutter speed into consideration. Further, when the frame rate is a fixed value, the group division number may be the minimum value that makes it possible to secure an exposure time by which appropriate exposure can he obtained based on only the shutter speed.

Further, in this embodiment, although a description depending on the assumption that a monochrome image is taken by the CMOS image sensor 1 as the frame image has been given for the sake of convenience, it goes without saying that the present invention is also effective for a case where a color image is taken as the frame image.

In that case, if the configuration in which, for example, the CMOS image sensor 1 is provided with a filter array of Bayer arrangement is employed, GB rows in which G pixels and B pixels are alternately arranged, and GR rows in which G pixels and R pixels are alternately arranged are alternately arranged in the V direction. Accordingly, when one set of lines consisting of a GB row and GR row adjacent to each other is set as one line in each group described in the abovementioned embodiment, and signals of pixels associated with generation of a frame image are sequentially read from each group in units of lines, it is possible to take a color image as the frame image.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed:

1. An imaging device comprising:
an imaging unit having a pixel group two-dimensionally arranged vertically and horizontally, and being configured to read pixel signals associated with generation of a frame image in units of lines by a rolling shutter system; and
a drive unit configured to periodically switch, when a plurality of frame images are consecutively read from the imaging unit with a predetermined frame period in video recording, positions of a plurality of lines each of which is made a read object in each of the frame images in units of frames;
wherein the drive unit performs switching such that positions of a plurality of lines, each of which is made a read object in each of two consecutive frame images, do not overlap each other to thereby make pixels of each of the lines output pixel signals with a period longer than the predetermined frame period;
wherein the drive unit divides a plurality of lines each of which is made a read object of pixel signals associated with generation of one frame image into a number of groups, and makes pixels of each of the lines output pixel signals with a period corresponding to the number of groups; and
wherein the imaging device further comprises a drive control unit configured to control the number of groups in accordance with an exposure time to be secured for a pixel group of each of the groups.

2. The imaging device according to claim 1, wherein the drive unit repetitively gives, to each of the lines, instructions indicative of a timing at which exposure is to be started, and a timing at which pixel signals are to be output to thereby make it possible to set a maximum length of the exposure time, which is a period from a start of exposure to output of pixel signals, to be longer than the predetermined frame period in the video recording.

3. The imaging device according to claim 1, wherein the drive unit sequentially assigns all the lines consisting of the pixel group to different groups at line intervals corresponding to the number of groups.

4. The imaging device according to claim 1, wherein the drive unit sequentially starts or ends exposure of pixels of all the lines in a same group in a same frame period.

5. An imaging device comprising:
an imaging unit having a pixel group two-dimensionally arranged vertically and horizontally, and being configured to read pixel signals associated with generation of a frame image in units of lines by a rolling shutter system; and
a drive unit configured to periodically switch, when a plurality of frame images are consecutively read from the imaging unit with a predetermined frame period in video recording, positions of a plurality of lines each of which is made a read object in each of the frame images in units of frames;
wherein the drive unit performs switching such that positions of a plurality of lines, each of which is made a read object in each of two consecutive frame images, do not overlap each other to thereby make pixels of each of the lines output pixel signals with a period longer than the predetermined frame period;
wherein the drive unit divides a plurality of lines each of which is made a read object of pixel signals associated with generation of one frame image into a number of groups, and makes pixels of each of the lines output pixel signals with a period corresponding to the number of groups; and
wherein the imaging device further comprises a drive control unit configured to control the number of groups in accordance with a required frame rate, and an exposure time to be secured for a pixel group of each of the groups.

6. An imaging device comprising:
an imaging unit having a pixel group two-dimensionally arranged vertically and horizontally, and being configured to read pixel signals associated with generation of a frame image in units of lines by a rolling shutter system; and
a drive unit configured to periodically switch, when a plurality of frame images are consecutively read from the imaging unit with a predetermined frame period in video recording, positions of a plurality of lines each of which is made a read object in each of the frame images in units of frames;
wherein the drive unit performs switching such that positions of a plurality of lines, each of which is made a read object in each of two consecutive frame images, do not overlap each other to thereby make pixels of each of the lines output pixel signals with a period longer than the predetermined frame period;
wherein the drive unit divides a plurality of lines each of which is made a read object of pixel signals associated with generation of one frame image into a number of groups, and makes pixels of each of the lines output pixel signals with a period corresponding to the number of groups; and
wherein the imaging device further comprises a drive control unit configured to control the number of groups in accordance with a resolution of a frame image.

7. An imaging device comprising:
an imaging unit having a pixel group two-dimensionally arranged vertically and horizontally, and being configured to read pixel signals associated with generation of a frame image in units of lines by a rolling shutter system; and
a drive unit configured to periodically switch, when a plurality of frame images are consecutively read from the imaging unit with a predetermined frame period in video recording, positions of a plurality of lines each of which is made a read object in each of the frame images in units of frames;

wherein the drive unit performs switching such that positions of a plurality of lines, each of which is made a read object in each of two consecutive frame images, do not overlap each other to thereby make pixels of each of the lines output pixel signals with a period longer than the predetermined frame period;

wherein the drive unit divides a plurality of lines each of which is made a read object of pixel signals associated with generation of one frame image into a number of groups, and makes pixels of each of the lines output pixel signals with a period corresponding to the number of groups; and wherein the imaging device further comprises:

an exposure control unit configured to arbitrarily set an exposure time within such a range that a period with which pixel signals are output from the pixels of each of the lines is not exceeded; and a drive control unit configured to set the number of groups in accordance with a maximum exposure time which is settable by the exposure control unit.

8. An imaging method for use in an imaging device including an imaging unit having a pixel group two-dimensionally arranged vertically and horizontally, the method comprising:

reading pixel signals associated with generation of a frame image in units of lines by a rolling shutter system; and periodically switching, when a plurality of frame images are consecutively read from the imaging unit with a predetermined frame period in video recording, positions of a plurality of lines each of which is made a read object in each of the frame images in units of frames;

wherein the switching is performed such that positions of a plurality of lines, each of which is made a read object in each of two consecutive frame images, do not overlap each other to thereby make pixels of each of the lines output pixel signals with a period longer than the predetermined frame period; and wherein a plurality of lines each of which is made a read object of pixel signals associated with generation of one frame image are divided into a number of groups, and pixels of each of the lines output pixel signals with a period corresponding to the number of groups; and wherein the number of groups is controlled in accordance with an exposure time to be secured for a pixel group of each of the groups.

9. A non-transitory computer-readable storage medium having a program stored thereon which controls a computer of an imaging device including an imaging unit having a pixel group two-dimensionally arranged vertically and horizontally, the program being executable to control the computer to perform functions comprising:

reading pixel signals associated with generation of a frame image in units of lines by a rolling shutter system; and periodically switching, when a plurality of frame images are consecutively read from the imaging unit with a predetermined frame period in video recording, positions of a plurality of lines each of which is made a read object in each of the frame images in units of frames;

wherein the switching is performed such that positions of a plurality of lines, each of which is made a read object in each of two consecutive frame images, do not overlap each other to thereby make pixels of each of the lines output pixel signals with a period longer than the predetermined frame period; and wherein a plurality of lines each of which is made a read object of pixel signals associated with generation of one frame image are divided into a number of groups, and pixels of each of the lines output pixel signals with a period corresponding to the number of groups; and wherein the number of groups is controlled in accordance with an exposure time to be secured for a pixel group of each of the groups.

* * * * *